United States Patent
Kobayashi et al.

(10) Patent No.: US 10,336,211 B2
(45) Date of Patent: Jul. 2, 2019

(54) BATTERY PACK (71) Applicant: HONDA MOTOR CO., LTD., Tokyo (JP)

(72) Inventors: Naoki Kobayashi, Wako (JP);
Hiroyuki Kikuchi, Wako (JP);
Takahiro Kato, Wako (JP); Takashi Sone, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/986,303

(22) Filed: May 22, 2018

(65) Prior Publication Data
US 2018/0361874 A1 Dec. 20, 2018

(30) Foreign Application Priority Data

Jun. 19, 2017 (JP) ................................. 2017-119354

(51) Int. Cl.
B60K 1/04 (2019.01)
B60L 11/18 (2006.01)
H01M 2/10 (2006.01)
B60L 50/64 (2019.01)

(52) U.S. Cl.
CPC ............ B60L 11/1879 (2013.01); B60K 1/04 (2013.01); B60L 50/64 (2019.02); H01M 2/1072 (2013.01); H01M 2/1077 (2013.01); H01M 2/1083 (2013.01); B60K 2001/0438 (2013.01); B60Y 2200/124 (2013.01); H01M 2220/20 (2013.01)

(58) Field of Classification Search
CPC ... B60L 11/1879; B60L 50/64; H01M 2/1072; H01M 2220/20; B60K 1/04; B60K 2001/0438
See application file for complete search history.

(56) References Cited

U.S. PATENT DOCUMENTS

| 4,276,632 | A | * | 6/1981 | Hiraishi | ................. | G04C 3/008 |
| | | | | | | 368/203 |
| 4,444,373 | A | * | 4/1984 | Hayashi | ............... | B60K 15/067 |
| | | | | | | 248/544 |
| 4,725,515 | A | * | 2/1988 | Jurca | ................... | H01M 2/0413 |
| | | | | | | 29/623.1 |
| 5,136,475 | A | * | 8/1992 | McDermott | ............. | B60Q 7/00 |
| | | | | | | 340/908 |
| 5,557,810 | A | * | 9/1996 | Antos | ...................... | E03D 5/01 |
| | | | | | | 4/321 |

(Continued)

FOREIGN PATENT DOCUMENTS

| CN | 206179954 U | * | 5/2017 |
| CN | 206179954 U | | 5/2017 |

(Continued)

Primary Examiner — Jacob B Meyer
(74) Attorney, Agent, or Firm — Armstrong Teasdale LLP (57) ABSTRACT A battery pack includes: an upper case having an upper-case side flange and a lower case having a lower-case side flange opposing the upper case-side flange, wherein the battery pack is provided with an upper case-side depending wall that depends from an outer edge of the upper case-side flange beyond the lower case-side flange, with the upper case-side depending wall being spaced from an outer edge of the lower case-side flange, and a lower case-side depending wall that depends from the outer edge of the lower case-side flange.

8 Claims, 6 Drawing Sheets (56) References Cited

U.S. PATENT DOCUMENTS

| | | | | |
|---|---|---|---|---|
| 6,227,322 | B1* | 5/2001 | Nishikawa | B60R 16/04 180/65.1 |
| 7,350,610 | B2* | 4/2008 | Kikuchi | H01M 2/04 180/68.5 |
| 8,210,301 | B2* | 7/2012 | Hashimoto | B60K 1/04 180/68.5 |
| 8,247,097 | B1* | 8/2012 | Duff | H01M 2/1077 429/50 |
| 8,372,530 | B2* | 2/2013 | Kubota | B60K 1/04 180/65.1 |
| 8,877,364 | B2* | 11/2014 | Hashimura | B60K 1/04 180/68.5 |
| 8,900,744 | B2* | 12/2014 | Loo | H01M 2/1229 429/172 |
| 9,040,184 | B2* | 5/2015 | Duff | H01M 2/1077 429/120 |
| 9,227,582 | B2* | 1/2016 | Katayama | B60K 1/04 |
| 9,331,321 | B2* | 5/2016 | Berger | H01M 2/1083 |
| 9,761,851 | B2* | 9/2017 | Onodera | H01M 2/1077 |
| 9,960,391 | B2* | 5/2018 | Nakamori | H01M 2/043 |
| 10,118,475 | B2* | 11/2018 | Sugizaki | B60K 1/04 |
| 10,173,511 | B2* | 1/2019 | Hara | B60K 1/04 |
| 2008/0190679 | A1* | 8/2008 | Sato | B60K 1/04 180/68.5 |
| 2008/0318119 | A1* | 12/2008 | Watanabe | B60L 11/1874 429/99 |
| 2010/0136402 | A1* | 6/2010 | Hermann | H01M 2/1077 429/120 |
| 2010/0253519 | A1* | 10/2010 | Brackmann | B60P 3/03 340/572.1 |
| 2010/0273040 | A1* | 10/2010 | Kubota | B60K 1/04 429/100 |
| 2010/0294580 | A1* | 11/2010 | Kubota | B60K 1/04 180/68.1 |
| 2010/0307848 | A1* | 12/2010 | Hashimoto | B60K 1/04 180/68.5 |
| 2011/0139527 | A1* | 6/2011 | Bannier | B60K 1/04 180/68.5 |
| 2011/0222240 | A1* | 9/2011 | Kawata | B60L 3/00 361/690 |
| 2012/0064391 | A1* | 3/2012 | Fukaya | H01M 2/08 429/163 |
| 2012/0086176 | A1* | 4/2012 | Kondou | F16J 15/067 277/631 |
| 2012/0115000 | A1* | 5/2012 | Hashimura | B60K 1/04 429/100 |
| 2012/0164500 | A1* | 6/2012 | Loo | H01M 2/1072 429/82 |
| 2012/0251863 | A1* | 10/2012 | Berger | H01M 2/1083 429/99 |
| 2014/0099535 | A1* | 4/2014 | Chu | H01M 2/08 429/178 |
| 2014/0284125 | A1* | 9/2014 | Katayama | B60K 1/04 180/68.5 |
| 2015/0079454 | A1* | 3/2015 | Maguire | H01M 2/1083 429/159 |
| 2015/0221907 | A1* | 8/2015 | Satou | H01M 10/0481 429/157 |
| 2015/0357606 | A1* | 12/2015 | Nishimura | H01M 2/024 429/176 |
| 2017/0018745 | A1* | 1/2017 | Nakamori | H01M 2/043 |
| 2017/0117514 | A1* | 4/2017 | Yamada | H01M 10/6551 |
| 2017/0267089 | A1* | 9/2017 | Sugizaki | B60K 1/04 |
| 2017/0346142 | A1* | 11/2017 | Landerer | H01M 2/1072 |
| 2018/0361874 | A1* | 12/2018 | Kobayashi | B60K 1/04 |

FOREIGN PATENT DOCUMENTS

| | | | |
|---|---|---|---|
| CN | 207977365 U | * | 10/2018 |
| JP | 2009-146881 A | | 7/2009 |
| JP | 2011-194982 A | | 10/2011 |
| JP | 2014-194907 A | | 10/2014 |
| JP | 2014186970 A | * | 10/2014 |

* cited by examiner

BATTERY PACK

TECHNICAL FIELD

The present invention relates to a battery pack, and particularly relates to a battery pack for a vehicle such as an electric vehicle.

BACKGROUND ART

A known battery pack for an electric vehicle may include an upper case and a lower case jointly defining a battery chamber for containing a battery therein (see, for example, JP2009-146881A, JP2011-194982A, and JP2014-194907A).

The battery pack is often disposed under the floor of the vehicle body, and therefore, is preferably provided with waterproof property, so that the battery in the battery chamber is protected from water in such a case as when the vehicle travels through a puddle or on a flooded road and the battery pack is covered with water splashed by the wheels of the vehicle or the battery pack is partially or entirely submerged in water.

However, conventional battery packs still have room for improving the waterproof property. Particularly, prevention of intrusion of water into the battery chamber when the battery pack is submerged in water should be improved further.

SUMMARY OF THE INVENTION

A primary object of the present invention is to enhance the waterproof performance of the battery pack and to thereby improve the protection of the battery from water.

MEANS TO ACCOMPLISH THE TASK

One embodiment of the present invention provides a battery pack (90), comprising: an upper case (92) and a lower case (94) jointly defining a battery chamber (96) for containing a battery (98) therein; an upper case-side flange (112) extending outward from an outer periphery of the upper case (92) over an entire circumference of the outer periphery; a lower case-side flange (114) extending outward from an outer periphery of the lower case (94) over an entire circumference of the outer periphery so as to oppose the upper case-side flange (112); a seal member (132) interposed between the upper case-side flange (112) and the lower case-side flange (114); a plurality of threaded bolts (118) each passing through the upper case-side flange (112) and the lower case-side flange (114); a plurality of nuts (128) threadably engaged with the threaded bolts (118), respectively, to join the upper case (92) and the lower case (94) to each other; an upper case-side depending wall (134) that depends from an outer edge of the upper case-side flange (112) over an entire circumference thereof beyond the lower case-side flange (114), the upper case-side depending wall (134) being spaced from the outer edge of the lower case-side flange (114); and a lower case-side depending wall (136) that depends from an outer edge of the lower case-side flange (114) over an entire circumference thereof.

This arrangement enhances the waterproof performance of the battery pack (90) and thereby improves the protection of the battery (98) from water.

In the above battery pack (90), preferably, the upper case-side flange (112) includes a rib (140) constituted of a ridge extending at a position closer to the outer edge of the upper case-side flange than the seal member (132) over the entire circumference thereof and contacting the lower case-side flange (114).

This arrangement improves circumferential bending stiffness of the upper case-side flange (112), to thereby ensure flatness of the flange surface serving as a seal surface. As a result, the waterproof performance of the battery pack (90) is improved.

In the above battery pack (90), preferably, a space (138) defined between the upper case-side depending wall (134) and the lower case-side depending wall (136) is filled with resin (142).

This arrangement contributes to enhancement of the waterproof performance of the battery pack (90) and thereby improves the protection of the battery (98) from water.

In the above battery pack (90), preferably, the threaded bolts (118) are arranged to protrude upward from the lower case-side flange (114), the upper case-side flange (112) is provided with bolt through-holes (126) through which the threaded bolts (118) are passed, respectively, and the nuts (128) are engaged with the threaded bolts (118) passed through the bolt through-holes (126).

This arrangement improves the assembling workability of the upper case (92) and the lower case (94).

In the above battery pack (90), preferably, the lower case (94) is made of metal, the upper case (92) is molded with resin, the threaded bolts (118) are welding bolts welded to the lower case (94), and collar members (124) having a higher compression resistance than the upper case-side flange (112) are mounted on the upper case-side flange (112) such that the collar members (124) define the bolt through-holes (126).

Owing to this arrangement, damage to the upper case-side flange (112) due to excessive tightening of the nuts (128) on the threaded bolts (118) can be avoided.

In the above battery pack (90), preferably, the each of the threaded bolts (118) has a tapered portion (118C) in a tip end portion thereof.

This arrangement improves the assembling workability of the upper case (92) and the lower case (94).

Another aspect of the present invention provides an electric vehicle (1) including the aforementioned battery pack (90), wherein the battery pack is disposed under a floor of a vehicle body (5).

The battery pack according to an aspect of the present invention has an enhanced waterproof performance and therefore improves the protection of the battery from water.

DESCRIPTION OF THE PREFERRED EMBODIMENT(S)

First, an exemplary electric vehicle carrying a battery pack according to a preferred embodiment of the present invention is described with reference to FIG. 1.

The illustrated electric vehicle 1 includes a lower frame (chassis) 5 mainly consisting of left and right front side frames 10 and left and right rear side frames 12.

Each front side frame 10 extends linearly from front to rear with an upward slant angle relative to a horizontal plane and an outboard spread angle toward the rear end thereof, such that the distance between the pair of front side frames 10 increases from front to rear. Therefore, the front side frames 10 define a trapezoidal shape having a long side in the rear end thereof as seen in plan view.

Each rear side frame 12 has a front end joined to an upper side of a rear end of a corresponding one of the front side frames 10 by welding or the like. Each rear side frame 12 extends linearly rearward with an upward slant angle same as that of the front side frame 10 relative to the horizontal plane, and in parallel to the other rear side frame 12.

The lower frame 5 further includes a front end cross member 14 extending laterally (in a vehicle width direction) and having two ends attached to the respective front ends of the front side frames 10, a first front middle cross member 16 extending laterally and having two ends attached to parts of the respective front side frames 10 near the front ends thereof, and a second front middle cross member 18 extending laterally and having two ends attached to longitudinally intermediate parts of the respective front side frames 10.

The lower frame 5 further includes a rear middle cross member 20 extending laterally and having two ends attached to parts of the respective rear side frames 12 near the front ends thereof, and a rear end cross member 22 extending laterally and having two ends attached to parts of the respective rear side frames 12 near the rear ends thereof.

An extension member 24 is attached to a longitudinally intermediate part of each front side frame 10 such that the extension member 24 protrudes in the outboard direction. The free end of each extension member 24 is attached to the lower end of a corresponding one of left and right front pillars (A-pillars) 26. The front pillars 26 extend vertically upward from the respective extension members 24, and the upper ends of the front pillars 26 are connected to each other by a steering hanger frame 28 that extends laterally and horizontally.

Each front side frame 10 is fitted with a damper housing 30. The upper parts of the two damper housings 30 are connected to each other by a cowl panel 32.

Left and right front wheels 36 are each supported by a corresponding pair of the front side frame 10 and the damper housing 30 via a strut type front suspension system 34.

A steering column 40 is attached to the steering hanger frame 28 via a column mount 38. An upper end of the steering column 40 is attached to a steering wheel 42, and a lower end of the steering column 40 is connected to a per se known steering device not shown in the drawings, which steers the front wheels 36 according to the rotational angle of the steering wheel 42.

A rear suspension bracket 44 is attached to a rear end part of each front side frame 10. Each rear suspension bracket 44 supports a corresponding one of left and right rear wheels 48 via a semi-trailing arm 46.

A center pillar (B-pillar) 52 is attached to a front end part of each rear side frame 12 via a rear pillar base member 50. A roll bar 54 having an inverted U-shape is provided such that lower ends of the roll bar 54 are attached to the rear middle cross member 20. A rear pillar (C-pillar) 56 is attached, at a lower end thereof, to a rear end portion of each rear side frame 12. An upper end of each rear pillar 56 is attached to the roll bar 54.

A cowl upper frame 57 extending laterally is attached to an upper edge of the cowl panel 32, and front ends of left and right roof frames 58 are attached to lateral ends of the cowl upper frame 57, respectively. Each roof frame 58 includes a front upper pillar section 58A extending rearward from the cowl upper frame 57 with an upward slant, and a roof side rail section 58B extending rearward and substantially horizontally from the rear end (upper end) of the corresponding front upper pillar section 58A and, after passing by an upper end part of the corresponding center pillar 52 in the fore and aft direction, attached to the roll bar 54.

Between the front upper pillar sections 58A is connected a rectangular windshield retaining frame 60 fitted with a sheet of windshield glazing.

A front seat 66 for a driver is mounted on the front side frames 10 via front and rear seat mounting brackets 62, 64 in a detachable manner. A rear seat 68 for a single passenger is mounted on the rear side frames 12 in a detachable manner.

Each front pillar 26 is fitted with a pair of door hinges 70 for a side door 72. A side door opening 74 which can be closed and opened by the corresponding side door 72 is defined on each side of the front seat 66. The driver seated on or to be seated on the front seat 66 can get out of or into the vehicle through the side door opening 74, and the passenger seated on or to be seated on the rear seat 68 can also get out of or into the vehicle through the side door opening 74 but only after tilting the seat back of the front seat 66 to the front.

A power unit 76 (see FIG. 2) is positioned between the two rear side frames 12. The power unit 76 includes a motor 78 such as a permanent magnet motor (PM motor) and a reduction gear unit 80 constituted of a plurality of gears, and rotationally drives the rear wheels 48.

Figure 2:
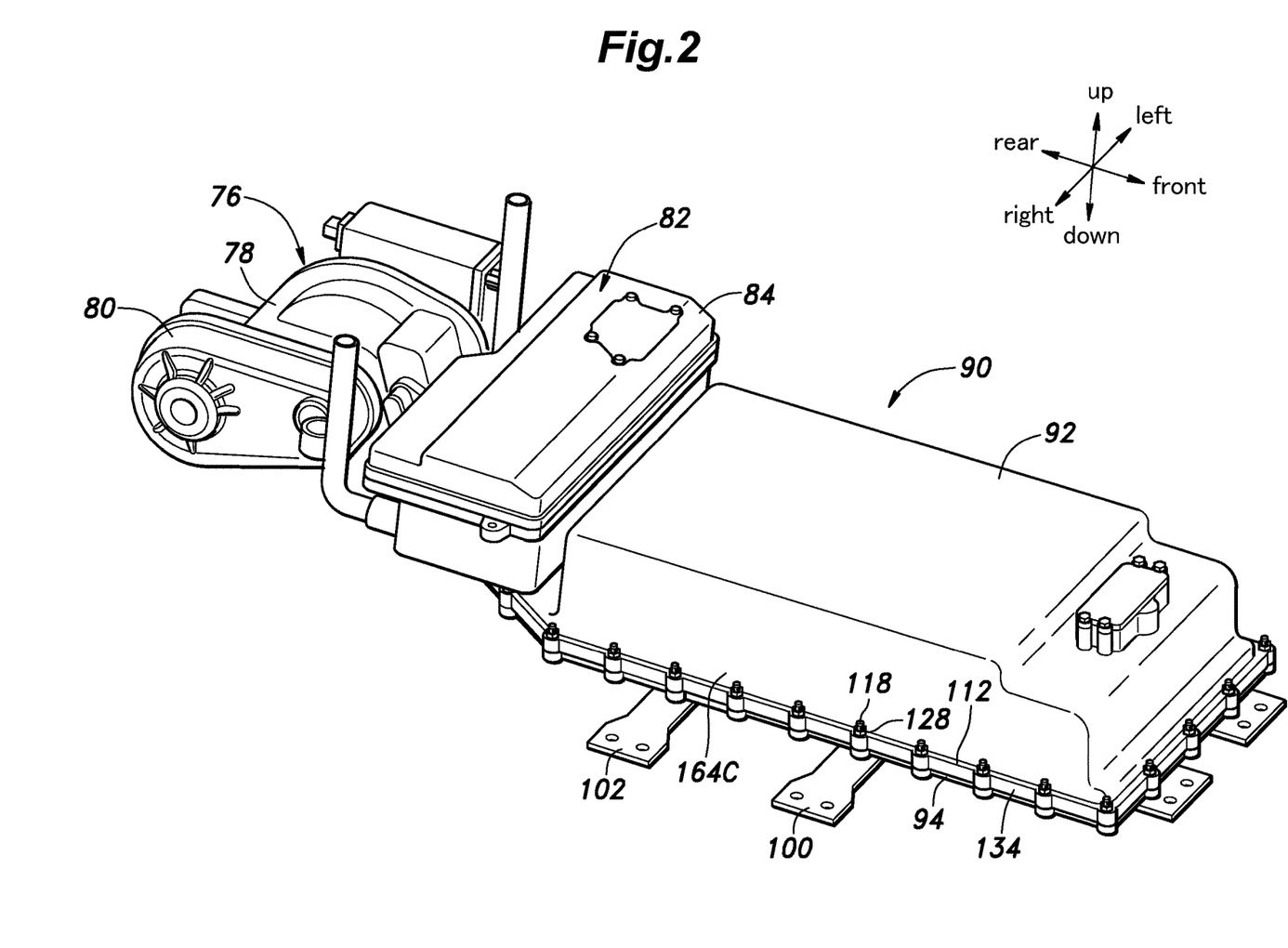
FIG. 2 is a perspective view showing an electric system including the battery pack according to the embodiment.
Figure 3:
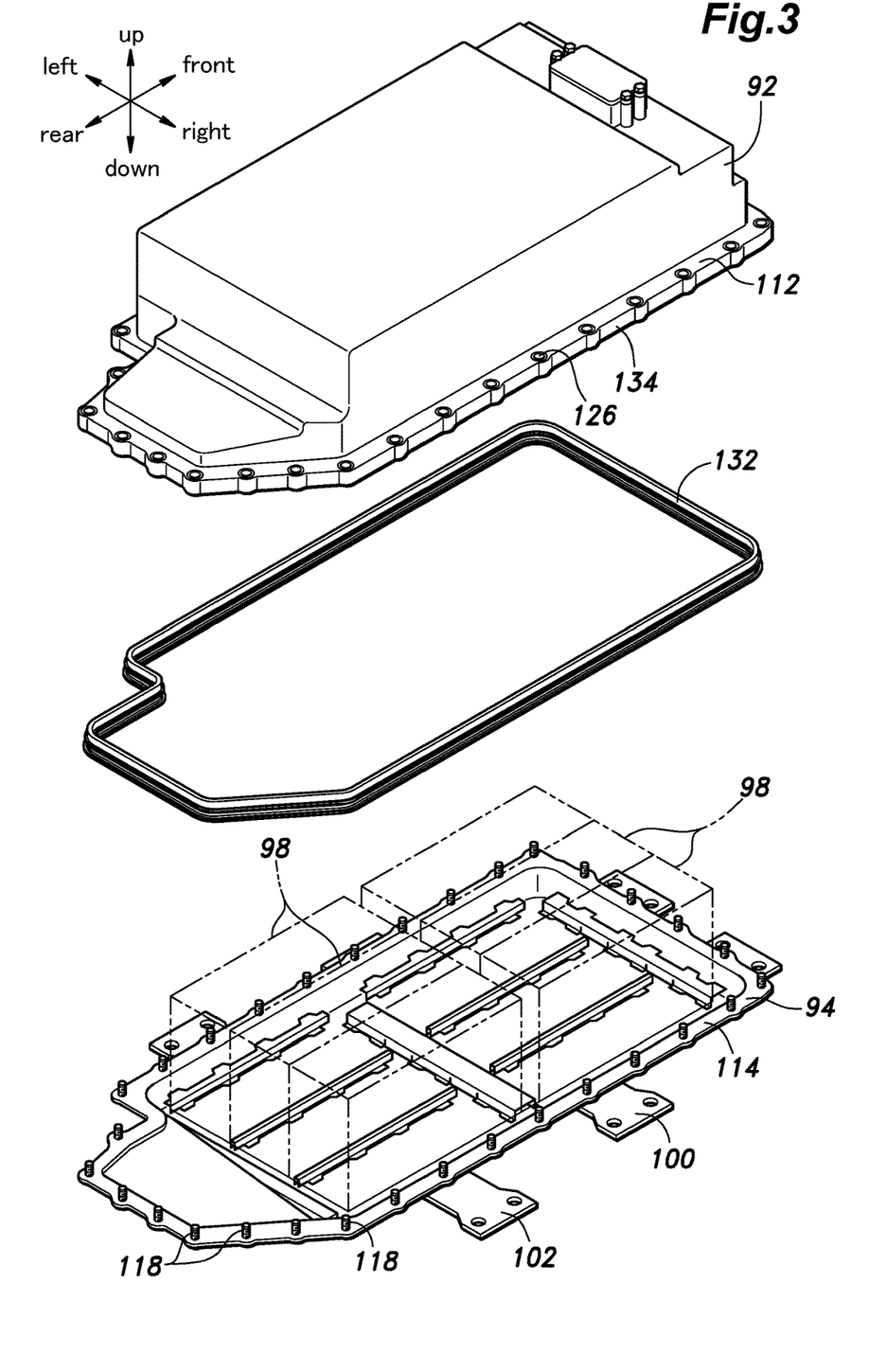
FIG. 3 is an exploded perspective view of the battery pack according to the embodiment.

As shown in FIG. 2, a power control unit 82 is positioned in front of the power unit 76. The power control unit 82 includes an air tight electric box 84, and the electric box 84 contains therein an electric power conversion unit (not shown in the drawings) including an inverter (not shown in the drawings) and a DC/DC converter (not shown in the drawings), and an electronic control unit (not shown in the drawings) for controlling the supply of electric power to the motor 78. The electric box 84 is fixed to the front side frames 10.

Figure 1:
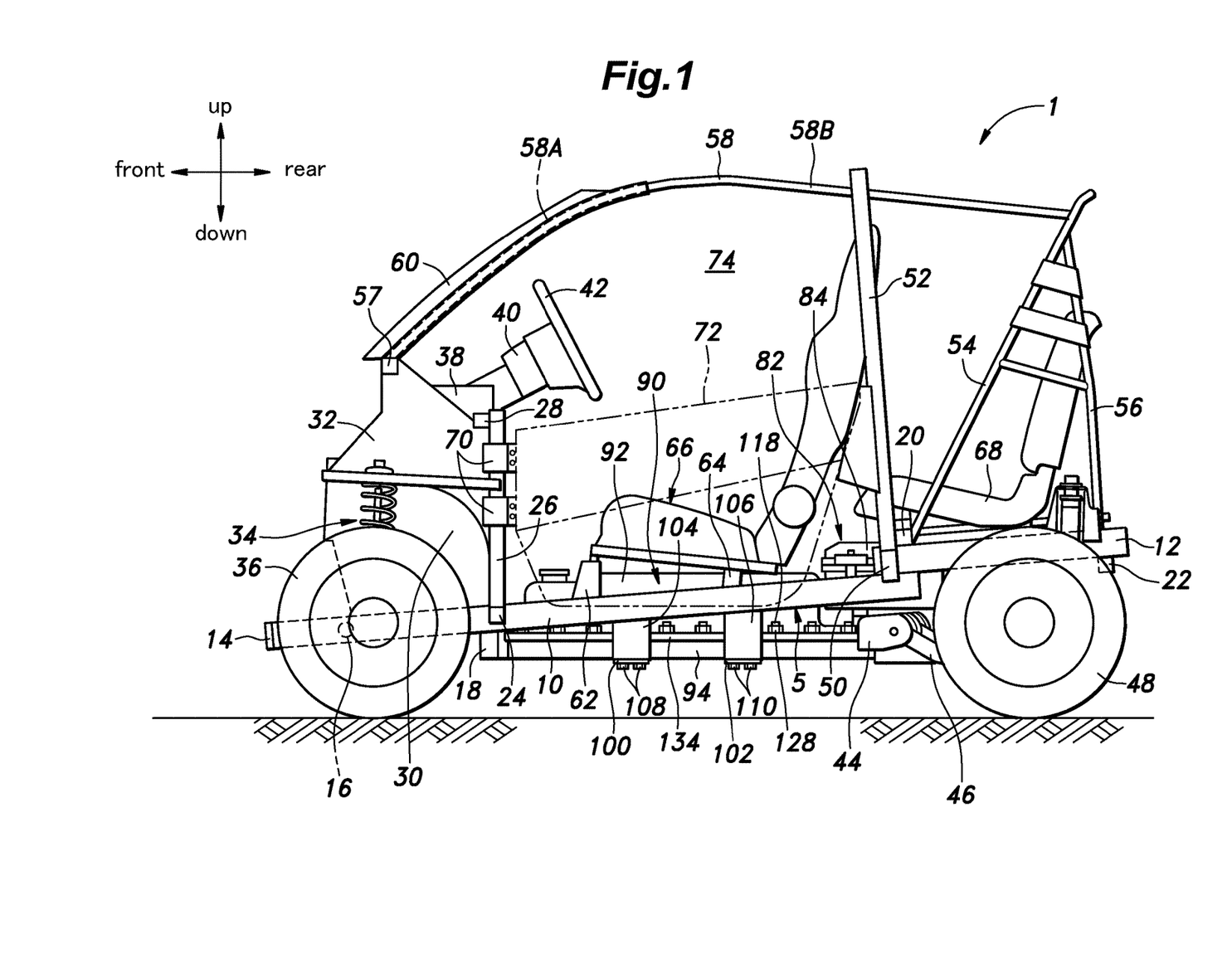
FIG. 1 is a side view showing an exemplary electric vehicle carrying a battery pack according to a preferred embodiment of the present invention.

As shown in FIG. 1, a battery pack 90 serving as a power supply for the motor 78 and the power control unit 82 is disposed between the front side frames 10.

In the following, the battery pack 90 will be described in detail with reference to FIGS. 2 to 5.

The battery pack 90 includes an upper case 92 and a lower case 94 each elongated in a direction along the lower frame 5 or in the fore and aft direction of the vehicle and having a substantially rectangular shape as seen in plan view. The upper case 92 and the lower case 94 cooperate with each other to define a sealed battery chamber 96. A plurality of batteries 98 mounted on the lower case 94 are contained in the battery chamber 96 (see FIG. 3).

A pair of battery mount plates 100 and 102 each consisting of a laterally extending plate member are attached to an underside of the lower case 94 at two longitudinally spaced positions such that the ends of each of the battery mount plates 100 and 102 protrude laterally. The protruding ends of the battery mount plates 100 are fastened by means of threaded bolts 108 to a pair of battery mount brackets 104 (see FIG. 1) provided on the respective front side frames 10, while the protruding ends of the battery mount plates 102 are fastened by means of threaded bolts 110 to another pair of battery mount brackets 106 (see FIG. 1) provided on the respective front side frames 10 at a position spaced apart rearward from the battery mount brackets 104, whereby the battery pack 90 is detachably secured to the lower frame 5 and arranged substantially horizontally under the floor of the vehicle.

The upper case 92 is a resin-molded product formed in a box-like shape having a trapezoidal transverse sectional shape and an open bottom. The upper case 92 has an upper case-side flange 112 protruding from a lower outer periphery thereof outwardly and substantially horizontally over an entire circumference of the outer periphery. The lower case 94 is a press-molded product formed by press-molding a steel plate into a tray-like shape (or a shallow dish-like shape), and has a lower case-side flange 114 protruding from an upper outer periphery thereof outwardly and substantially horizontally over an entire circumference of the outer periphery. The lower case 94 is preferably made of metal such as steel to have a sufficient strength against small stones and pebbles kicked up by the wheels of the traveling vehicle.

The shape of the outer periphery of the upper case 92 is substantially the same as the shape of the outer periphery of the lower case 94, such that the upper case-side flange 112 and the lower case-side flange 114 have an identical planar shape and vertically oppose (face) each other.

Figure 4:
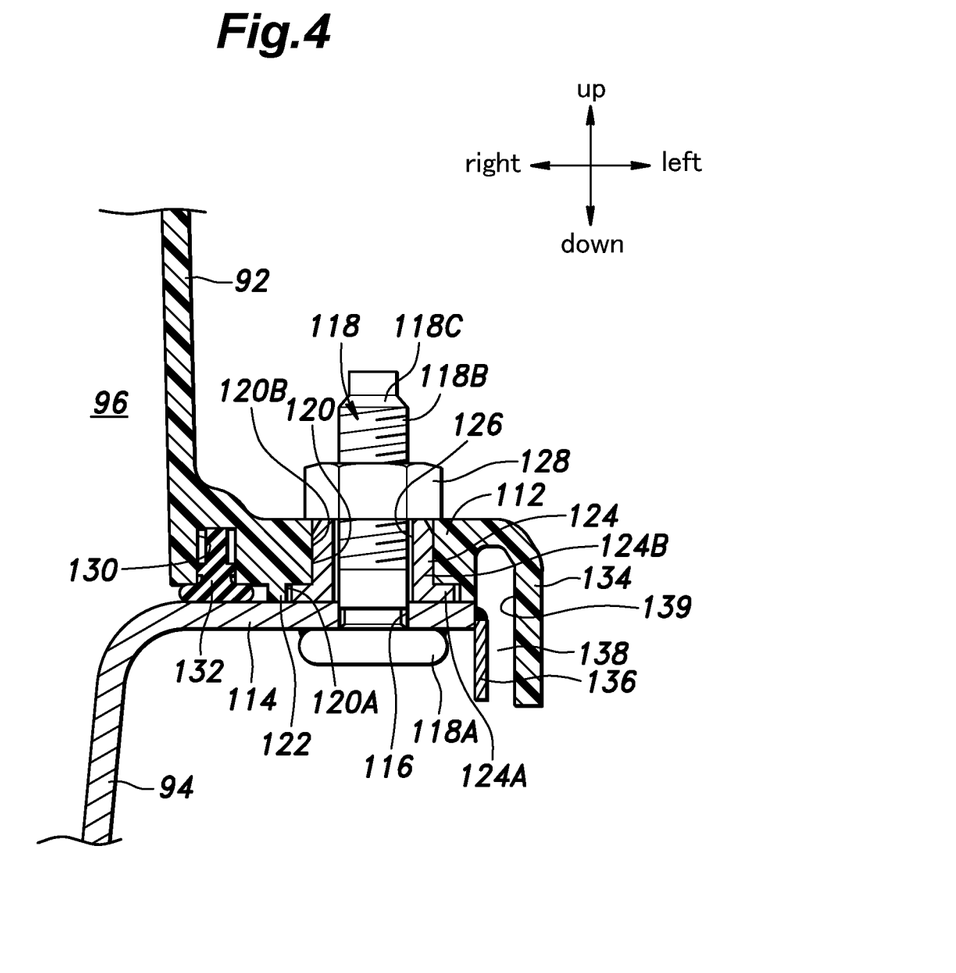
FIG. 4 is an enlarged sectional view of a part of the battery pack according to the embodiment.

The lower case-side flange 114 is provided with a plurality of bolt through-holes 116 arranged along a circumferential extension of the flange 114 at a predetermined interval such that each bolt through-hole 116 extends through the thickness of the flange 114, as shown in FIG. 4. A plurality of threaded bolts 118 are passed through the respective bolt through-holes 116 from the underside. Each threaded bolt 118 has a circular head 118A and a male thread portion 118B having a diameter smaller than the diameter of the circular head 118A, and the circular head 118A is welded to the bottom surface of the lower case-side flange 114, whereby the threaded bolt 118 constitutes a welding bolt. The male thread portion 118B of the threaded bolt 118 protrudes upward from the lower case-side flange 114. A tip end portion (upper end portion) of the male thread portion 118B includes a tapered portion 118C that diminishes in diameter toward the end.

The upper case-side flange 112 is provided with a plurality of collar mounting holes 120 at positions vertically aligned with the threaded bolts 118 of the lower case-side flange 114 such that each collar mounting hole 120 extends through the thickness of the upper case-side flange 112, as shown in FIG. 4. Each collar mounting hole 120 includes a large diameter portion 120A in a lower part thereof and a small diameter portion 120B in an upper part thereof, where the large diameter portion 120A has a short axial length while the small diameter portion 120B has a long axial length. The large diameter portion 120A is defined by one of a plurality of annular bosses 122 (see FIG. 5) molded integrally on the bottom surface of the upper case-side flange 112.

Each collar mounting hole 120 has a collar member 124 inserted therein. The collar member 124 is made of metal or hard plastic to have a higher compression resistance (compressive strength) than the upper case-side flange 112. The collar member 124 includes a large diameter portion 124A having a relatively short axial length and placed in the large diameter portion 120A and a small diameter portion 124B having a relatively long axial length and inserted in the small diameter portion 120B, and defines a bolt through-hole 126 through which the male thread portion 118B is passed.

The upper case 92 and the lower case 94 are joined (secured) to each other by placing the upper case-side flange 112 on the lower case-side flange 114 such that the threaded bolts 118 are inserted into the respective bolt through-holes 126, and engaging and tightening the nuts 128 on the respective male thread portions 118B protruding upward from the upper case-side flange 112 through the corresponding bolt through-holes 126.

This joining work is performed by positioning the upper case 92 relative to the lower case 94 such that the bolt through-holes 126 of the upper case-side flange 112 are aligned with the respective threaded bolts 118, which protrude upright from the upper surface of the lower case-side flange 114, and therefore, the joining work can be achieved more easily and promptly compared to a case where the lower case-side flange 114 is provided with a plurality of welding nuts, and it is required to position the upper case 92 relative to the lower case 94 such that the bolt through-holes 126 of the upper case-side flange 112 are aligned with the welding nuts (hole-to-hole alignment).

Further, when the threaded bolts 118 are inserted into the bolt through-hole 126, the tapered portion 118C of the tip end portion of each threaded bolt 118 serves as a guide for aligning the threaded bolt 118 with the corresponding bolt through-hole 126, and thus, facilitates the insertion.

Each nut 128 may have an outer dimension such that the nut 128 contacts an upper surface of the upper case-side flange 112 in addition to an upper end surface of the collar member 124, and the axial length of the large diameter portion 120A of the collar mounting hole 120 (or the boss 122) before tightening of the nut 128 may be slightly longer than the axial length of the large diameter portion 124A of the collar member 124 while the axial length of the small diameter portion 120B of the collar mounting hole 120 (or the thickness of the upper case-side flange 112 excluding the boss 122) before tightening of the nut 128 may be substantially the same as or slightly longer than the axial length of the small diameter portion 124B of the collar member 124. Thereby, when the nut 128 is tightened on the male thread portion 118B, the nut 128 presses the boss 122 on the bottom surface of the upper case-side flange 112 against the lower case-side flange 114. It is to be noted that the tightening of the nut 128 on the male thread portion 118B is limited by the collar member 124, and therefore, damage to the upper case-side flange 112 due to excessive tightening of the nut 128 on the male thread portion 118B can be prevented.

The upper case-side flange 112 is formed with a the seal mounting groove 130 that opens on the bottom surface of the upper case-side flange 112 and extends over the entire circumference of the upper case-side flange 112 at a position closer to the battery chamber 96 than the collar members 124 are or a position between the base end (inner end) of the upper case-side flange 112 and the collar members 124. In the seal mounting groove 130 is fitted a base portion of an annular seal member 132 made of elastic material such as rubber. Thereby, the seal member 132 is installed on the underside of the upper case-side flange 112, and a part of the seal member 132 protruding out of the seal mounting groove 130 comes into contact with the upper surface of the lower case-side flange 114 while undergoing an elastic deformation when the upper case 92 and the lower case 94 are joined to each other.

Thus, the seal member 132 is interposed between the upper case-side flange 112 and the lower case-side flange 114 over the entire circumference thereof, and provides waterproof sealing to prevent intrusion of water into the battery chamber 96 from outside.

Figure 5:
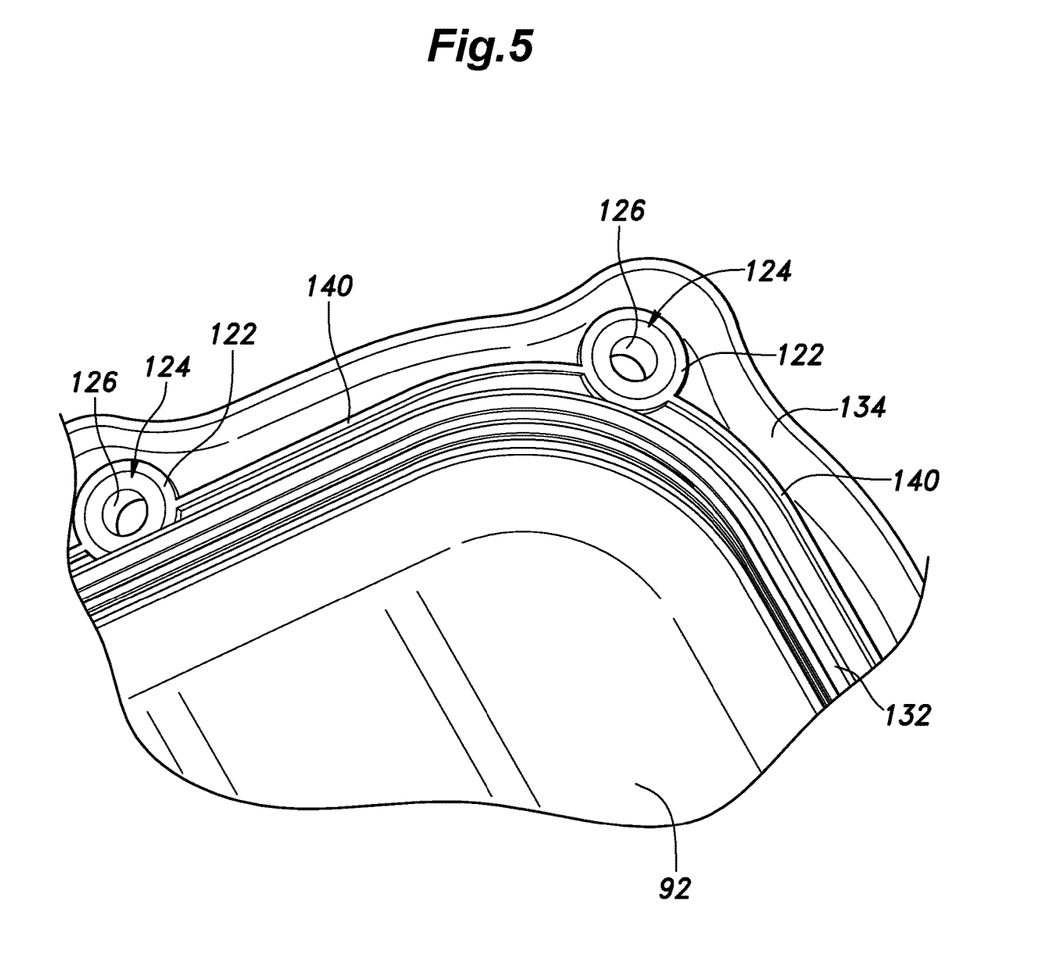
FIG. 5 is a partial lower perspective view of an upper case of the battery pack of the embodiment.

The upper case-side flange 112 is provided on the under surface thereof with a rib 140 constituted of a ridge integrally molded with the flange 112 at a position closer to the outer edge of the flange 112 than the seal member 132 or between the outer edge and the seal member 132 (see FIG. 5). The rib 140 extends over the entire circumference of the upper case-side flange 112 while connecting between the circumferentially adjoining bosses 122. Such a rib 140 improves circumferential bending stiffness of the upper case-side flange 112, and prevents undesired deformation of the upper case-side flange 112 caused by tightening of the nuts 128. As a result, flatness of the flange surface serving as a seal surface is ensured, and the waterproof performance of the battery pack 90 is improved.

The rib 140 is in contact with the upper surface of the lower case-side flange 114 together with the bosses 122 when the upper case 92 and the lower case 94 are joined to each other. This arrangement achieves a large contact pressure produced at the contacting portion, and provides a blocking effect preventing intrusion of water to the waterproof sealing portion constituted of the seal member 132. Thus, the rib 140 also contributes to improving the waterproof performance of the battery pack 90.

The upper case 92 is provided with an upper case-side depending wall 134 that is formed integrally with the upper case 92 to depend from the outer edge of the upper case-side flange 112 beyond the under surface of the lower case-side flange 114 (namely, to a position below the under surface of the lower case-side flange 114), where the upper case-side depending wall 134 is spaced from the outer edge of the lower case-side flange 114. The lower case 94 is provided with a lower case-side depending wall member 136 that is formed of a plate member and welded to the lower case 94 to depend from the outer edge of the lower case-side flange 114. The lower end of the upper case-side depending wall 134 and the lower end of the lower case-side depending wall member 136 may be positioned at the same height.

The upper case-side depending wall 134 extends over the entire circumference of the upper case-side flange 112, and the lower case-side depending wall member 136 extends over the entire circumference of the lower case-side flange 114, with a space 138 being defined between the upper case-side depending wall 134 and the lower case-side depending wall member 136 over the entire circumference of the upper case-side flange 112 and the lower case-side flange 114. The space 138 is defined so as to open only at the bottom thereof, and is dimensioned such that water is discharged from the space 138 under gravitational force without being retained therein due to its surface tension. A part of the underside of the upper case-side flange 112 inwardly adjoining the upper case-side depending wall 134 is formed with a downwardly open recess 139 that extends circumferentially and is connected to an upper part of the space 138 defined between the upper case-side depending wall 134 and the lower case-side depending wall member 136, such that the recess 139 serves as an upper extension of the space 138. Thereby, the recess 139 and the space 138 jointly form a space extending from above to below an interface between the upper case-side flange 112 and the lower case-side flange 114.

The provision of the upper case-side depending wall 134 prevents water splashed by the wheels during travel of the vehicle from reaching the overlapping parts of the upper case-side flange 112 and the lower case-side flange 114 from outside, and thereby prevents intrusion of water between the overlapping parts of the upper case-side flange 112 and the lower case-side flange 114.

The provision of the lower case-side depending wall member 136 prevents water splashed by the wheels during travel of the vehicle from reaching the overlapping parts of the upper case-side flange 112 and the lower case-side flange 114 after colliding with the upper case-side depending wall 134 from inside, and thereby prevents intrusion of water between the overlapping parts of the upper case-side flange 112 and the lower case-side flange 114.

The space 138 is defined to open only at the bottom thereof (like an inverted cup), and therefore, even when the electric vehicle 1 travels through a puddle or the like and the water level becomes higher than the overlapping parts of the upper case-side flange 112 and the lower case-side flange 114, air is trapped in the space 138, and the air trapped in the space 138 prevents intrusion of water between the overlapping parts of the upper case-side flange 112 and the lower case-side flange 114.

Thus, owing to the above features, waterproof sealing provided by the seal member 132 is reliably maintained when the battery pack 90 is covered with water, and the waterproof performance of the battery pack 90 is enhanced. As a result, protection of the batteries 98 from water is improved.

The reason for the lower case-side depending wall member 136 being welded to the lower case-side flange 114 is that in a case where the lower case-side depending wall member 136 is integrally formed with the lower case-side flange 114 by press-molding, it is difficult to achieve sufficient flatness of the lower case-side flange 114 that serves as a seal surface. Further, in the above-configured battery pack 90, because the part of the underside of the upper case-side flange 112 inwardly adjoining the upper case-side depending wall 134 is formed with the recess 139 extending circumferentially and connected to an upper part of the space 138 defined between the upper case-side depending wall 134 and the lower case-side depending wall member 136 (namely, the recess 139 and the space 138 jointly form a space vertically extending from above to below the interface between the upper case-side flange 112 and the lower case-side flange 114), a larger space for trapping air when the battery pack 90 is submerged in water is formed, compared to a case where the recess 139 is not formed on the underside of the upper case-side flange 112 (or the space for trapping air extends only below the interface between the upper case-side flange 112 and the lower case-side flange 114). As the recess 139 and the space 138 jointly form a space extending from above to below the interface between the upper case-side flange 112 and the lower case-side flange 114, even if splashed water enters the space 138 from below, the water passes by the interface between the upper case-side flange 112 and the lower case-side flange 114 into the recess 139, and therefore, the water is effectively prevented from reaching and intruding through the interface.

Figure 6:
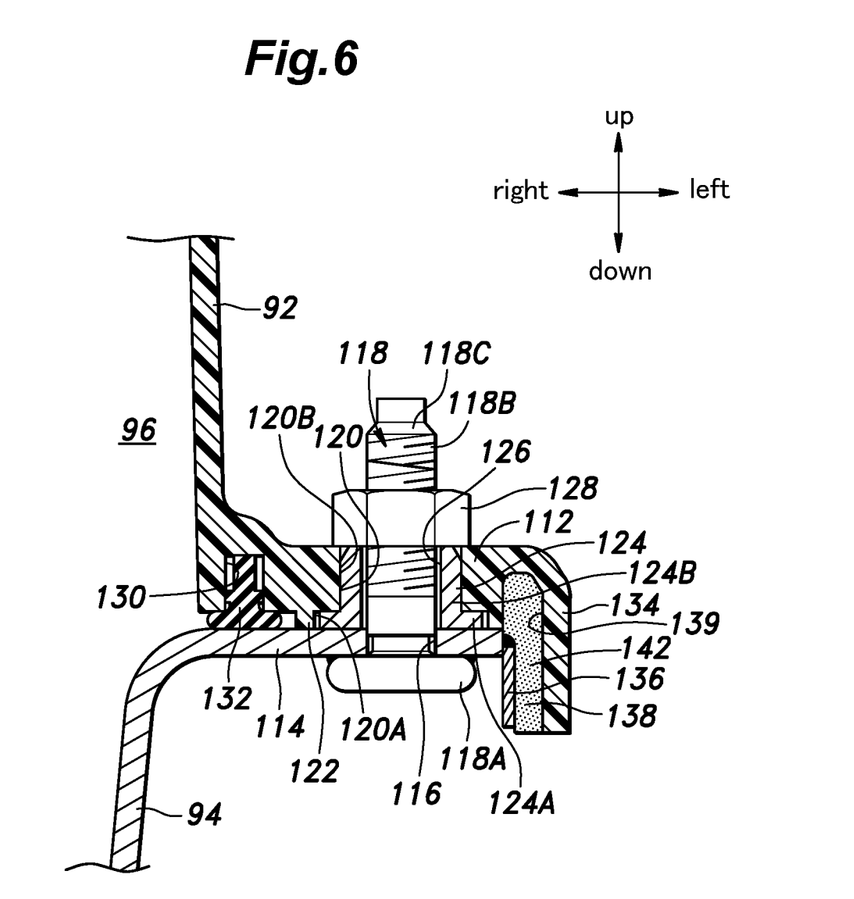
FIG. 6 is an enlarged sectional view of a part of a battery pack according to another embodiment.

Another embodiment of the battery pack 90 will be described below with reference to FIG. 6. In FIG. 6, parts corresponding to those shown in FIG. 4 are denoted by the same reference numerals as used in FIG. 4, and detailed description thereof will be omitted.

In the embodiment shown in FIG. 6, the space 138 (and the recess 139 also) is filled with resin 142 such as silicone resin. As the space 138 is filled with the resin 142, the water splashed by the wheels during travel of the vehicle is prevented from reaching the overlapping parts of the upper case-side flange 112 and the lower case-side flange 114, and therefore, even when the vehicle travels through a puddle or the like and the water level becomes higher than the overlapping parts of the upper case-side flange 112 and the lower case-side flange 114, water is prevented from entering the space 138, and hence, intrusion of water between the overlapping parts of the upper case-side flange 112 and the lower case-side flange 114 can be prevented even more reliably.

Thus, the arrangement shown in FIG. 6 enhances the waterproof performance of the battery pack 90, and improves the protection of the batteries 98 from water.

In the foregoing, the present invention has been described in terms of a preferred embodiment thereof. However, as will be readily appreciated by a person of ordinary skill in the art, the present invention is not limited to such an embodiment, and may be modified appropriately within a scope of the present invention defined in the appended claims. For example, the lower case-side depending wall member 136 may be provided as a press-molded product constituting an integral part of the lower case 94 together with the lower case-side flange 114. The battery pack 90 is not limited for use in electric vehicles, but may be used as a power supply for hybrid vehicles, various electric appliances, etc.

Also, not all of the component parts shown in the foregoing embodiment are necessarily indispensable, and they may be selectively used as appropriate without departing from the scope of the present invention.

The invention claimed is:

1. A battery pack, comprising:
an upper case and a lower case jointly defining a battery chamber for containing a battery therein;
an upper case-side flange extending outward from an outer periphery of the upper case over an entire circumference of the outer periphery;
a lower case-side flange extending outward from an outer periphery of the lower case over an entire circumference of the outer periphery so as to oppose the upper case-side flange;
a seal member interposed between the upper case-side flange and the lower case-side flange;
a plurality of threaded bolts each passing through the upper case-side flange and the lower case-side flange;
a plurality of nuts threadably engaged with the threaded bolts, respectively, to join the upper case and the lower case to each other,
an upper case-side depending wall that depends from an outer edge of the upper case-side flange over an entire circumference thereof beyond the lower case-side flange, the upper case-side depending wall being spaced from an outer edge the lower case-side flange; and
a lower case-side depending wall that depends from the outer edge of the lower case-side flange over an entire circumference thereof,
wherein the upper case-side flange includes a rib constituted of a ridge extending at a position closer to the outer edge thereof than the seal member over an entire circumference thereof and contacting the lower case-side flange,
the upper case-side flange is provided with bolt through-holes through which the threaded bolts are passed, respectively, and the nuts are engaged with the threaded bolts passed through the bolt through-holes,
the upper case-side flange is provided with a plurality of annular bosses on a bottom surface thereof, each boss protruding downward from the bottom surface and surrounding a corresponding one of the bolt through holes, and circumferentially adjoining bosses being connected by the rib, and
the rib and the bosses are pressed against an upper surface of the lower case-side flange with the nuts being engaged with the threaded bolts passed through the bolt through-holes.

2. The battery pack as claimed in claim 1, wherein a space defined between the upper case-side depending wall and the lower case-side depending wall is filled with resin.

3. The battery pack as claimed in claim 1, wherein the threaded bolts are arranged to protrude upward from the lower case-side flange.

4. The battery pack as claimed in claim 3, wherein each of the threaded bolts has a tapered portion in a tip end portion thereof.

5. The battery pack as claimed in claim 1, wherein a part of an underside of the upper case-side flange inwardly adjoining the upper case-side depending wall is formed with a recess that extends circumferentially and is connected to an upper part of a space defined between the upper case-side depending wall and the lower case-side depending wall.

6. An electric vehicle including the battery pack as claimed in claim 1, wherein the battery pack is disposed under a floor of a vehicle body.

7. The battery pack as claimed in claim 1, wherein the upper case is molded with resin, and collar members having a higher compression resistance than the upper case-side flange are mounted on the upper case-side flange such that the collar members define the bolt through-holes.

8. A battery pack, comprising:
an upper case and a lower case jointly defining a battery chamber for containing a battery therein;
an upper case-side flange extending outward from an outer periphery of the upper case over an entire circumference of the outer periphery;
a lower case-side flange extending outward from an outer periphery of the lower case over an entire circumference of the outer periphery so as to oppose the upper case-side flange;
a seal member interposed between the upper case-side flange and the lower case-side flange;
a plurality of threaded bolts each passing through the upper case-side flange and the lower case-side flange;
a plurality of nuts threadably engaged with the threaded bolts, respectively, to join the upper case and the lower case to each other,
an upper case-side depending wall that depends from an outer edge of the upper case-side flange over an entire circumference thereof beyond the lower case-side flange, the upper case-side depending wall being spaced from an outer edge the lower case-side flange; and
a lower case-side depending wall that depends from the outer edge of the lower case-side flange over an entire circumference thereof,
wherein the threaded bolts are arranged to protrude upward from the lower case-side flange, the upper case-side flange is provided with bolt through-holes through which the threaded bolts are passed, respectively, and the nuts are engaged with the threaded bolts passed through the bolt through-holes, and
wherein the lower case is made of metal, the upper case is molded with resin, the threaded bolts are welding bolts welded to the lower case, and collar members having a higher compression resistance than the upper case-side flange are mounted on the upper case-side flange such that the collar members define the bolt through-holes.

* * * * *